United States Patent [19]

Belart

[11] Patent Number: 4,732,001
[45] Date of Patent: Mar. 22, 1988

[54] HYDRAULIC BOOSTER WITH BOOST-PRESSURE RESPONSIVE VALVE

[75] Inventor: Juan Belart, Walldorf, Fed. Rep. of Germany

[73] Assignee: Alfred Teves GmbH, Frankfurt am Main, Fed. Rep. of Germany

[21] Appl. No.: 758,306

[22] Filed: Jul. 24, 1985

[30] Foreign Application Priority Data

Jul. 31, 1984 [DE] Fed. Rep. of Germany .... 3428136

[51] Int. Cl.⁴ ............................................. B60T 15/38
[52] U.S. Cl. ....................................... 60/550; 60/555; 60/578
[58] Field of Search ...................... 60/547.1, 548, 555, 60/562, 574, 578, 589, 550, 575

[56] References Cited

U.S. PATENT DOCUMENTS

| | | | |
|---|---|---|---|
| 2,458,803 | 1/1949 | Stelzer | 60/550 X |
| 3,978,670 | 9/1976 | Kruse et al. | 60/550 X |
| 4,114,376 | 9/1978 | Cattaneo et al. | 60/562 X |
| 4,242,867 | 1/1981 | Belart | 60/547.1 X |
| 4,483,144 | 11/1984 | Steffes | 60/562 X |
| 4,649,707 | 3/1987 | Belart | 60/550 |

FOREIGN PATENT DOCUMENTS 2460529  4/1980  Fed. Rep. of Germany ........ 60/550
2098687A 11/1982 United Kingdom ................. 60/562

Primary Examiner—Robert E. Garrett
Assistant Examiner—George Kapsalas
Attorney, Agent, or Firm—James B. Raden; Robert P. Seitter

[57] ABSTRACT

A braking pressure generator (1,21) for a vehicular hydraulic brake system, wherein a booster piston (15) which is slidable by hydraulic pressure is displaceable in the actuating direction. The booster piston (15) is arranged as a stepped piston with a smaller-diameter portion (16) close to the pedal. The booster piston (15) includes a blind-end bore remote from the pedal in which a master cylinder piston (43) is sealedly guided, wherein the smaller-diameter portion (16) of the booster piston (15) confines an annular chamber (18) diminishing upon brake application. A valve (30) is connected to the annular chamber (18) controllable by the pressure in the pressure chamber (14) of the hydraulic power booster. The valve closes a connection between the annular chamber (18) and an unpressurized supply reservoir (9). A direct connection can be established between the annular chamber (18) and the working chamber (22) by way of the valve (30) and by circumventing a sealing collar.

12 Claims, 2 Drawing Figures

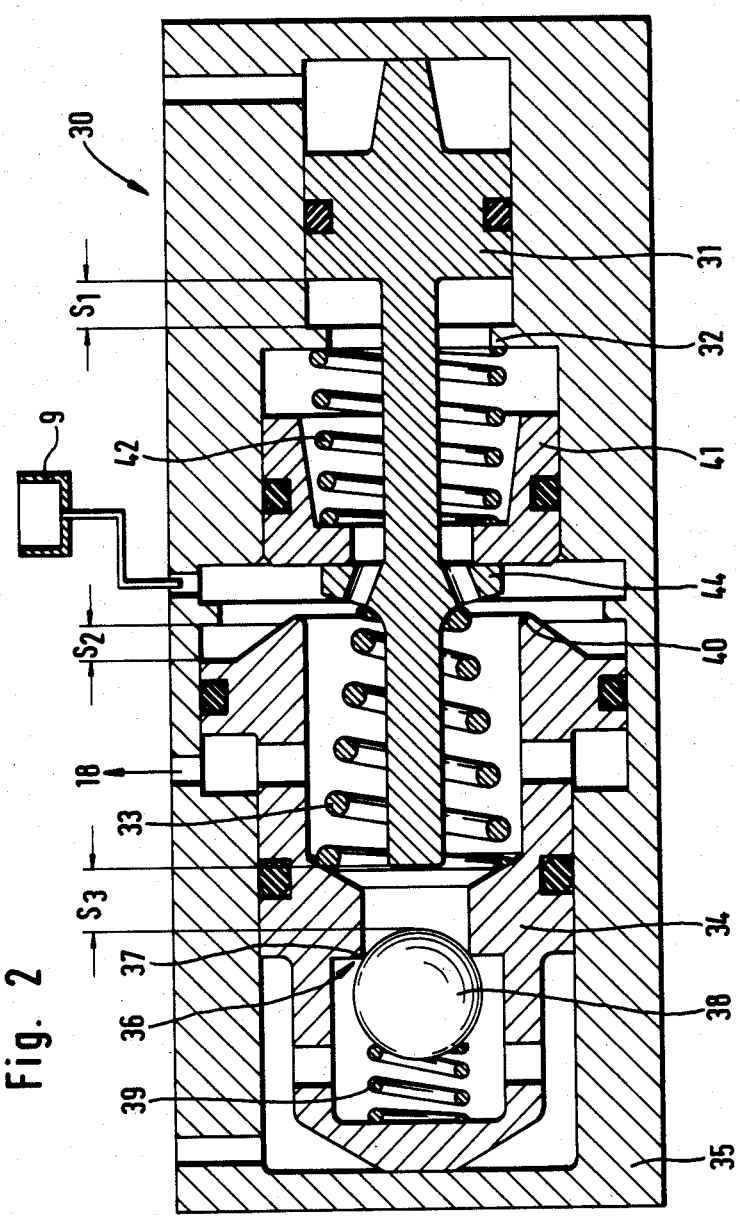

HYDRAULIC BOOSTER WITH BOOST-PRESSURE RESPONSIVE VALVE

BACKGROUND OF THE INVENTION

1. Field of the Invention

The present invention relates to a braking pressure generator for a vehicular hydraulic brake system, wherein a booster piston which is slidable by hydraulic auxiliary pressure is displaceable in the actuating direction. The booster piston is designed as a stepped piston with a smaller-diameter portion close to the pedal, and the booster piston includes a blind-end bore in which a master cylinder piston is sealedly guided. The smaller-diameter portion of the booster piston confines an annular chamber diminishing upon brake application. A valve is connected to the annular chamber and is controllable by the pressure in the pressure chamber of the hydraulic power booster, the valve closing a connection between the annular chamber and an unpressurized supply reservoir.

2. Brief Description of the Prior Art

A braking pressure generator having the foregoing features is described in German patent application No. P 34 08 873.3 (corresponding to U.S. Pat. No. 4,649,707 issued on Mar. 17, 1987). The braking pressure generator according to the application comprises a pedal-actuatable piston rod arranged coaxially to a booster piston. Parallel to the booster piston a so-called brake valve is disposed which is connected by way of a lever arrangement with the pedal-actuatable push rod. The face of the booster piston close to the pedal limits a pressure chamber which, depending on the position of the brake valve, is connected with an unpressurized supply reservoir or, alternatively, with an auxiliary energy source.

The booster piston is substantially designed as a stepped piston with an annular chamber being created between the piston step with the smaller diameter and the housing of the braking pressure generator, with the volume of the annular chamber diminishing upon brake application. The annular chamber normally (with the brake in released condition and the auxiliary pressure source not operative) communicates by way of a two-way/two-position directional control valve with an unpressurized supply reservoir. The two-way/two-position directional control valve can be controlled hydraulically, while the pressure from the pressure chamber of the hydraulic power booster can be fed to the hydraulic control drive.

If an actuating force is applied to the brake pedal in the brake system described, the piston rod connected to the brake pedal is displaced relative to the booster piston so as to actuate the lever mechanism, which at first causes a hydraulic connection between the pressure chamber of the hydraulic power booster and the unpressurized supply reservoir to be interrupted. When the force at the brake pedal is increased, the brake valve eventually assumes a position in which the pressure chamber of the hydraulic power booster is supplied with hydraulic pressure from an auxiliary pressure source. Once a predetermined level is exceeded, the pressure then prevailing in the pressure chamber of the hydraulic power booster is finally capable of displacing the booster piston in the actuating direction, which in turn causes the tandem master cylinder connected downstream of the hydraulic power booster to be pressurized. Thus, actuation of the brake circuits connected to the tandem master cylinder is effected.

As described, during a brake actuation the volume of the annular chamber between the booster piston and the housing of the braking pressure generator diminishes. The pressure prevailing in the pressure chamber of the hydraulic power booster, apart from displacing the booster piston, also causes the two-way/two-position directional control valve connected to the annular chamber to be switched into a locking position so that the annular chamber is separated from the unpressurized supply reservoir. The volume of pressure fluid enclosed in the annular chamber in this operating condition is additionally supplied, upon further displacement of the booster piston, by way of respective sealing collars to the working chamber of the master cylinder which is connected downstream of the hydraulic power booster, in such a way as to result in a relative displacement between the booster piston and the master cylinder piston, with the master cylinder piston traveling a longer distance than the booster piston.

As is known, no auxiliary pressure can be built up in the pressure chamber of the hydraulic power booster in case of a failure of the auxiliary pressure source. Accordingly, the two-way/two-position directional control valve remains in its idle position in which the annular chamber is permanently connected with the unpressurized supply reservoir. In case of a displacement of the booster piston, which is now effected exclusively by mechanical force acting on the brake pedal, the volume in the annular chamber can relieve pressure to the unpressurized supply reservoir, without any additional forces counteracting the brake application.

In a similiar fail condition, therefore, only the considerably smaller area of the master cylinder piston is effective, although it is ensured by appropriate dimensioning that the required minimum braking effect is achieved.

It is a disadvantage in the brake system described that when the brake is applied while the auxiliary pressure source is intact, the volume enclosed in the annular chamber is supplied by way of an additional sealing collar into the working chamber of the master cylinder.

Therefore, it is the object of the present invention to simplify the design of a braking pressure generator of the type described.

SUMMARY OF THE INVENTION:

This object is achieved according to the present invention by the fact that a direct connection can be established between the annular chamber and the working chamber by way of the valve and by circumventing a sealing collar. It is further advantageous that a closing element normally sitting close to a valve seat of the valve in the connection between the working chamber and the annular chamber can be switched into an opening position of the valve gate not only by the pressure prevailing in the pressure chamber, but also by the pressure from the master cylinder. An advantageous embodiment of the valve provides that the closing element is disposed in a piston element displaceable by the pressure from the master cylinder and is preloaded by a spring against a matching valve seat provided at the piston element. On the other hand, the closing element is arranged in such a way that it can be lifted from its seat by a piston pressurizable by the pressure prevailing in the booster chamber, with the piston being disposed substantially coaxially to the piston element and axially slidable. With regard to simplicity, the piston element is provided with a valve seat at its end facing away from the pressurized surface. In order to separate the annular chamber from the unpressurized supply reservoir, an annular piston is displaceably arranged coaxially to the piston element and the piston which is designed as a closing element and normally kept at a distance to the piston element by a shoulder of the piston. When the brake is in the released position, the piston element and the piston are disposed so as to abut to opposite housing faces.

The present invention further provides that the travel of the piston is limited by a stop in the housing in such a way that the closing element will remain in closing position in any case as long as the piston element remains in its idle position. In addition, the design of the annular piston is such that it can be made to abut to the valve seat of the piston element before the piston has performed its maximum travel. The result thereof is that advantageously the annular chamber is separated in any case from the unpressurized supply reservoir before the piston has performed its maximum travel. Thus it is ensured that, in case of normal brake actuation and corresponding travel, pressure fluid volume will escape toward the unpressurized supply reservoir.

In a further embodiment of the present invention the piston element can travel in the actuating direction a maximum distance which is less than the normal distance between the piston and the closing element disposed in the piston element. It is further provided that the normal distance between the piston and the closing element disposed in the piston element is less than the sum of:

(a) the maximum traveling distance between the piston in idle position and the stop associated to it, and (b) the maximum traveling distance of the piston element.

Preferably a ball is used as the closing element, which is an inexpensive standard part. An improvement in accordance with the present invention in addition provides that a first compression spring is inserted between the piston element and the piston and a second compression spring is inserted between the stop of the piston and the annular piston, with the first compression spring being stronger than the second compression spring. The first compression spring serves the purpose of establishing the idle position of the piston which is pressurizable by the pressure in the pressure chamber of the hydraulic power booster, while the second compression spring primarily serves the purpose of compensating the friction of the packing disposed at the annular piston.

BRIEF DESCRIPTION OF THE DRAWING

The mode of operation of the brake system according to the present invention is described hereinafter in more detail with reference to the accompanying drawing wherein:

FIG. 2 is an enlarged view of the valve of FIG. 1.

DETAILED DESCRIPTION OF THE PREFERRED EMBODIMENT

Figure 1:
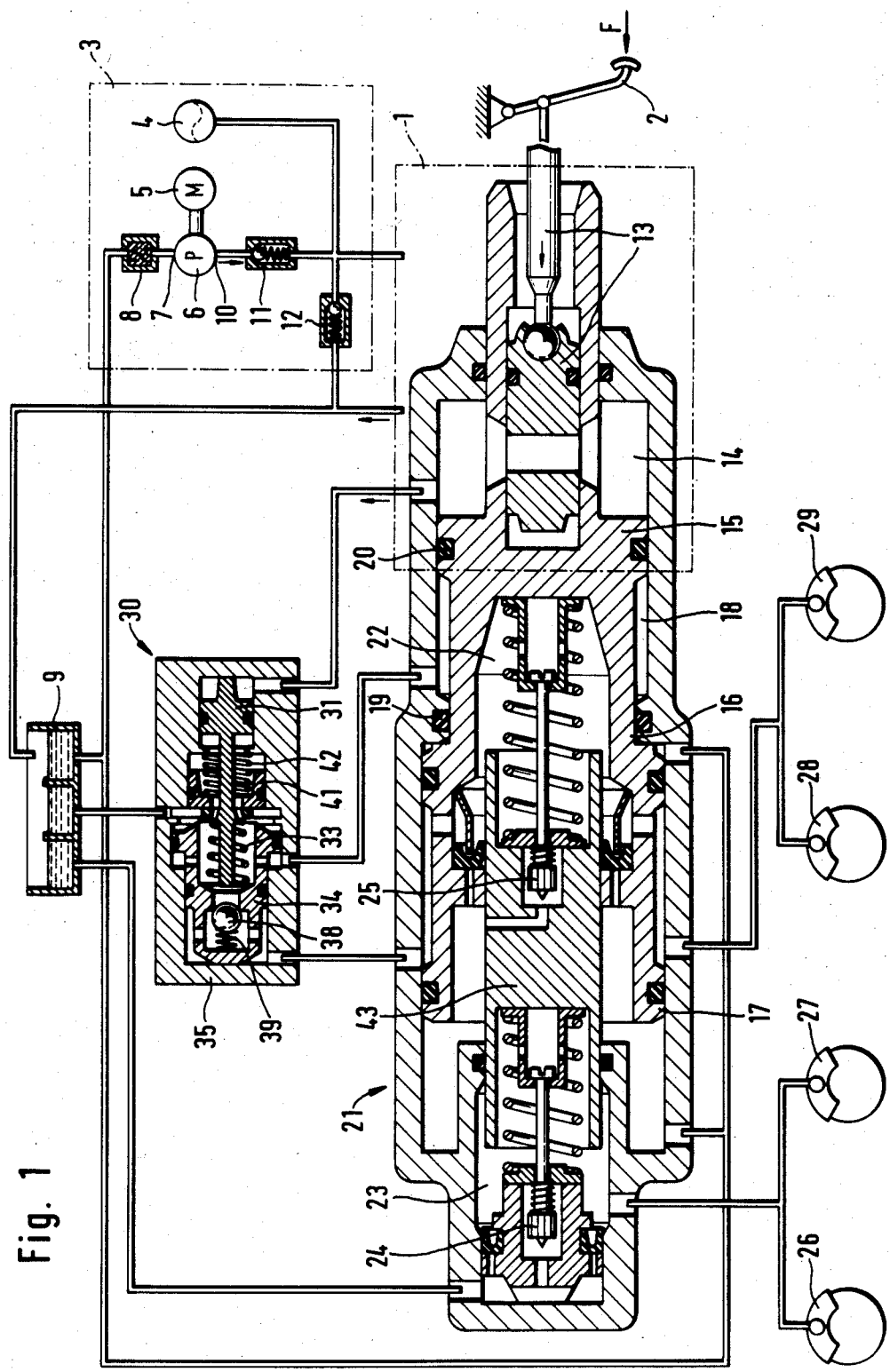
FIG. 1 is a sectional view of the entire brake system.

Reference numeral 1 in FIG. 1 designates a hydraulic power booster, the construction of which is described in detail in U.S. Pat. No. 4,649,707. Identical parts have been assigned identical reference numerals. The hydraulic power booster 1 can be actuated by a force applied to the brake pedal 2. The hydraulic power booster 1 is connected with an auxiliary pressure source 3 consisting essentially of a pressure accumulator 4 loaded by a pump 6 driven by an electric motor 5. The suction side 7 of the pump 6 communicates by way of a pressure medium filter 8 with an unpressurized supply reservoir 9. Connected to the pressure side 10 of the pressure medium pump 6 is a check valve 11 which prevents a return flow toward the pressure medium pump 6. Connected to the outlet of the check valve is a pressure relief valve 12 which, when the pressure exceeds a specified level, prevents further loading of the pressure accumulator 4 and carries away the volume delivered by the pressure medium pump toward the unpressurized supply reservoir 9.

The hydraulic power booster 1 essentially operates such that when a force is applied to the brake pedal 2, a piston rod 13 connected to the brake pedal 2 is displaced in the actuating direction, which causes a hydraulic pressure to be built up in the pressure chamber 14 of the hydraulic power booster 1 by way of a brake valve which is not shown. The pressure chamber 14 of the hydraulic power booster 1 is limited by a booster piston 15, the booster piston 15 having a portion 16 with a smaller diameter and a portion 17 with a larger diameter. The smaller-diameter portion 16 of the booster piston 15 and the housing confine an annular chamber 18, the volume of which diminishes upon brake application due to two sealing collars 19,20.

Downstream of the hydraulic power booster 1 a tandem master cylinder 21 is connected which comprises a working chamber 22 close to the pedal and a working chamber 23 remote from the pedal. To each working chamber a central valve 24,25 is allocated which upon displacement of the booster piston 15 or a pressure build-up in the working chamber 22 reaches a closing position in which the working chambers 22,23, which are normally in connection with the unpressurized supply reservoir 9, are hydraulically separated from the unpressurized supply reservoir 9. Wheel brakes 26,27,28,29 are connected to the working chambers 22,23 of the tandem master cylinder 21.

A further component of the brake system according to the present invention is a valve 30, wherein a piston 31 is pressurizable by the pressure prevailing from time to time in the pressure chamber 14 of the hydraulic power booster 1 and is displaceable toward the left is viewed in the drawing against a stop 32.

By means of a first compression spring 33, the piston 31 is supported on a piston element 34, while the piston element 34 is essentially bell-shaped and provided with a blind-end bore facing the piston 31. When the brake is in released position as shown in the drawing, the piston element 34 as well as the piston 31 abut to the housing 35 of the valve. Inside the piston element 34 a valve gate 36 is provided which substantially consists of a valve seat 37 disposed at the piston element 34 so as to match a closing element 38, with the closing element 38 being preloaded by a compression spring 39 in the closing direction of the valve gate 36. A further valve seat is provided at the opening of the piston element 34 facing the piston 31.

The drawings show that, coaxially to the piston 31, an annular piston 41 is disposed which, when the brake is in released position as shown in the drawings, is kept by a shoulder 44 of the piston 31 in a position in which a set distance is established between the annular piston 41 and the valve seat 40 of the piston element 34. The annular piston 41 is so designed as to form a further valve gate together with the valve seat 40 of the piston element 34. Between the annular piston 41 and the stop 32 a second compression spring 42 is inserted.

The essential point about the valve 30, of which FIG. 2 is an enlarged view, is that the maximum traveling distance $S_1$, of the piston 31 toward the stop 32 is shorter than the distance $S_3$ between the piston 31 and the closing element 38. Furthermore, it is essential that the piston element 34 can travel a maximum distance $S_2$ which is shorter than the distance $S_3$ between the piston 31 and the closing element 38. A further condition is that the sum of the distances $S_1$ and $S_2$ is greater than the distance $S_3$.

The mode of operation of the brake system described is explained in more detail hereinafter, starting from the brake's released condition in which all movable parts of the brake system adopt the position shown in FIG. 1. In such condition the working chambers 22,23 of the tandem master cylinder 21 communicate with the unpressurized supply reservoir 9. Furthermore, by way of the valve gate 40,41 of the valve 30, there is a hydraulic connection between the annular chamber 18 of the hydraulic power booster 1 and the unpressurized supply reservoir 9. When a force is applied to the brake pedal 2, hydraulic pressure is built up, as previously explained, in the pressure chamber 14 of the hydraulic power booster 1, said pressure acting on the piston 31 of the valve 30 and displacing it against the force of the first compression spring 33 toward the left as viewed in FIG. 1. This displacing movement is transmitted by the action of the second compression spring 42 to the annular piston 41, the annular piston 41 being pushed along by the compression spring 42. When the piston 31 is pressurized and the pressure in the booster chamber 14 of the hydraulic power booster has reached a certain level, the piston 31 will eventually have traveled the distance $S_1$.

A pressure build-up in the booster chamber 14 of the hydraulic power booster 1, on the other hand, will cause the booster piston 15 to be displaced in actuating direction so that the central valves 24,25 adopt a closing position and the working chambers 22,23 of the tandemaster cylinder 21 are separated from the unpressurized supply reservoir 9. A further displacement of the booster piston 15 or an increase of the actuating force F applied to the brake pedal 2 now causes a pressure build-up in the working chambers 22,23 of the tandem master cylinder 21 which propagates by way of corresponding pressure conduits to the piston element 34 and displaces the piston element 34 towards the right as viewed in the drawing, which finally causes the valve gate 40,41 between the annular chamber 18 of the hydraulic power booster and the unpressurized supply reservoir to be closed. Upon further pressure increase in the working chambers 22,23 of the tandem master cylinder, the closing element 38 will eventually push against the piston 31, which causes the valve gate 36 between the annular chamber 18 and the working chamber 22 to be opened. Upon continued displacement of the booster piston 15, the volume of pressure fluid escaping from the annular chamber 18 will now be fed by way of the valve gate 36 to the working chamber 22, thus starting a relative displacement between the master cylinder piston 43 and the booster piston 15, the master cylinder piston 43 moving faster than the booster piston 15. The great advantage of such an arrangement is that relatively short pedal travel is required to generate high master cylinder pressure.

In the event of a failure of the auxiliary pressure source 3 or an equivalent fail condition, the piston 31 is kept in abutment at the right end as viewed in the drawing by the action of the compression spring 33, since no pressure builds up in the pressure chamber 14 of the hydraulic power booster 1. Upon brake actuation the booster piston 15 is displaced to the left as viewed in the drawing solely by the force applied to the brake pedal, while, when the piston has traveled a distance predetermined by the construction, the central valves 24,25 in turn are closed so that the working chambers 22,23 are separated from the unpressurized supply reservoir 9. The pressure thus built up in the working chambers 22,23 of the tandem master cylinder 21 in turn reaches the pressurization surface of the piston element 34 of the valve 30 and causes the piston element 34 to be displaced toward the right as viewed in the drawing. However, the traveling distance of the piston element 34 is limited in such a way that the valve gate 40,41 remains open and the valve gate 36 remains in closed position so that the working chamber 22 still remains separated from the unpressurized supply reservoir 9.

In a similar fail condition, the annular chamber 18 of the hydraulic power booster remains in permanent communication with the unpressurized supply reservoir 9 by way of the valve gate 40,41 of the valve 30 so that a diminution of the annular chamber 18 cannot generate a force component counteracting the actuating force.

During the brake release operation in the types of brake actuation previously described (intact auxiliary pressure supply/failure of auxiliary pressure supply), the movements described are reversed until each of the movable parts again adopt the position as illustrated in FIG. 1.

What is claimed is:

1. A braking pressure generator for a hydraulic brake system for automotive vehicles, wherein a booster piston is slidably arranged in a housing and is displaceable in the actuating direction by hydraulic auxiliary pressure, wherein the booster piston is provided as a stepped piston with a smaller - diameter portion close to one end of the housing adapted to be located adjacent a brake pedal, wherein the piston includes a blind-end bore remote from the one end of the housing, wherein a master cylinder piston is sealedly guided in the blind-end bore and forms a working chamber therewith, wherein the smaller - diameter portion of the booster piston confines an annular chamber diminishing upon brake application, wherein a valve which is located in the housing and which is controllable by the pressure in a pressure chamber of the hydraulic power booster is connected to the annular chamber, said valve being operable for closing a connection between the annular chamber and an unpressurized supply reservoir, wherein a direct connection is established between the annular chamber and the working chamber by way of the valve and by circumventing a sealing collar, and wherein a closing element normally sitting close to a valve seat of the valve in the connection between the working chamber and the annular chamber is switched into an operating position of the valve gate by the pressure prevailing in the pressure chamber and by pressure from the master cylinder.

2. A braking pressure generator for a hydraulic brake system for automotive vehicles, wherein a booster piston is slidably arranged in a housing and is displaceable in the actuating direction by hydraulic auxiliary pressure, wherein the booster piston is provided as a stepped piston with a smaller - diameter portion close to one end of the housing adapted to be located adjacent a brake pedal, wherein the piston includes a blind-end bore remote from the one end of the housing, wherein a master cylinder piston is sealedly guided in the blind-end bore and forms a working chamber therewith, wherein the smaller - diameter portion of the booster piston confines an annular chamber diminishing upon brake application, wherein a valve which is located in the housing and which is controllable by the pressure in a pressure chamber of the hydraulic power booster is connected to the annular chamber, said valve being operable for closing a connection between the annular chamber and an unpressurized supply reservoir, wherein a direct connection is established between the annular chamber and the working chamber by way of the valve and by circumventing a sealing collar, and wherein the valve includes a closing element which is disposed in a piston element displaceable by the pressure from the master cylinder and which is preloaded by a spring against a matching valve seat provided at the piston element.

3. The braking pressure generator according to claim 2, wherein the closing element is lifted from its seat by a piston pressurizable by the pressure prevailing in the booster chamber, said piston being disposed substantially coaxially to the piston element and being axially slidable.

4. The braking pressure generator according to claim 3, wherein the piston element is provided with a valve seat at its end facing away from the pressurized surface.

5. The braking pressure generator according to claim 3, wherein the piston element can travel in actuating direction a maximum distance which is less than the normal distance between the piston and the closing element disposed in the piston element.

6. The braking pressure generator according to claim 3, wherein the normal distance between the piston and the closing element disposed in the piston element is less than the sum of:
(a) the maximum traveling distance between the piston in idle position and a stop associated therewith, and
(b) the maximum traveling distance of the piston element.

7. The braking pressure generator according to claim 6, wherein the closing element is a ball.

8. The braking pressure generator according to claim 6, wherein a first compression spring is inserted between the piston element and the piston and a second compression spring is inserted between the stop of the piston and the annular piston, with the first compression spring being stronger than the second compression spring.

9. A braking pressure generator for a hydraulic brake system for automotive vehicles, wherein a booster piston is slidably arranged in a housing and is displaceable in the actuating direction by hydraulic auxiliary pressure, wherein the booster piston is provided as a stepped piston with a smaller - diameter portion close to one end of the housing adapted to be located adjacent a brake pedal, wherein the piston includes a blind-end bore remote from the one end of the housing, wherein a master cylinder piston is sealedly guided in the blind-end bore and forms a working chamber therewith, wherein the smaller - diameter portion of the booster piston confines an annular chamber diminishing upon brake application, wherein a valve which is located in the housing and which is controllable by the pressure in a pressure chamber of the hydraulic power booster is connected to the annular chamber, said valve being operable for closing a connection between the annular chamber and an unpressurized supply reservoir, wherein a direct connection is established between the annular chamber and the working chamber by way of the valve and by circumventing a sealing collar, and wherein the valve includes an annular piston which is displaceably arranged coaxially to a piston and a piston element therein, which annular piston is designed as a closing element and normally kept at a distance to the piston element by a shoulder of the piston.

10. The braking pressure generator according to claim 9, wherein the piston element and the piston abut to opposite facing portions of the housing when the brake is in released position.

11. The braking pressure generator according to claim 10, wherein the travel of the piston is limited by a stop in the housing so that a closing element will remain in closing position against a valve seat of the valve as long as the piston element remains in its idle position abutting the respective one of said face portions of said housing.

12. The braking pressure generator according to claim 11, wherein the annular piston can be made to abut to a second valve seat before the piston has performed its predetermined maximum travel.

* * * * *